United States Patent [19]

Fukumitu et al.

[11] 4,432,084
[45] Feb. 14, 1984

[54] APPARATUS FOR REPRODUCING SIGNALS FROM A DISC

[75] Inventors: Akira Fukumitu, Fukaya; Koichi Kobayashi, Yokohama, both of Japan

[73] Assignee: Tokyo Shibaura Denki Kabushiki Kaisha, Kawasaki, Japan

[21] Appl. No.: 306,348

[22] Filed: Sep. 28, 1981

[30] Foreign Application Priority Data

Oct. 3, 1980 [JP] Japan .................... 55-137572

[51] Int. Cl.³ ............................................. G11B 17/04
[52] U.S. Cl. .................................................. 369/77.2
[58] Field of Search ......................................... 369/77

[56] References Cited

U.S. PATENT DOCUMENTS 4,220,339 9/1980 Coleman .................... 369/77.2
4,266,784 5/1981 Torrington ................. 369/77.2

FOREIGN PATENT DOCUMENTS

2087127 4/1982 United Kingdom ............ 369/77.2

Primary Examiner—Steven L. Stephan
Attorney, Agent, or Firm—Cushman, Darby & Cushman

[57] ABSTRACT

An apparatus for reproducing signals from a disc, comprises a gear assembly including a ratchet gear with 8 gear teeth rotating along one direction and cam gear with 4 gear teeth integrally formed with the ratchet gear, a rotary member which is reciprocally movable while being engaged with a casing inserted in a housing and which pivots the ratchet gear by an angle corresponding to one tooth along one direction, and an engaging member having a shaft as a fulcrum, a pin as a point of action and an engaging segment as a point of reaction. The shaft is providing pivotal support of the engaging member at the housing. The pin is in contact with a bottom land or tooth crest of the cam gear. The engaging segment is engaged with a holding frame to hold the holding frame to the housing when the pin is in contact with the bottom land of the cam gear, and is not engaged with the holding frame when the pin is in contact with the tooth crest thereof.

6 Claims, 15 Drawing Figures

APPARATUS FOR REPRODUCING SIGNALS FROM A DISC

BACKGROUND OF THE INVENTION

The present invention relates to an apparatus for reproducing signals, for example video and/or audio signals, from a disc, and more particularly to an apparatus including a means for holding a disc within a casing and for, when necessary, releasing the disc so that the disc may be taken out of the casing.

In general, a video disc is mounted on a turntable of an apparatus for reproducing PCM signals by a reproducing stylus coming in contact with the video disc to reproduce PCM signals recorded on the video disc. These signals consist of a video signal and an audio signal and are recorded at an extremely high packing density in accordance with the PCM (pulse code modulation) recording system, etc. When the surface of the video disc is contaminated by dust and fingerprints, reproduction is degraded and noise is mixed with the reproduced signals. Various apparatuses have been developed comprising a means for mounting and dismounting a video disc on the turntable without it being touched by the hand.

The outer periphery of the video disc is surrounded by a holding frame which is locked in a casing with one side remaining open; thus, the video disc is stored in the casing. The video disc in this condition is inserted in the apparatus for producing PCM signals from one side. When insertion is completed, the video disc surrounded by the holding frame is held in the apparatus for producing PCM signals, and the holding frame is unlocked from the casing. When the casing is pulled out of the apparatus for reproducing PCM signals, the video disc with the holding frame is automatically removed from the open side of the casing, whereby the video disc and the holding frame remain inside the apparatus for reproducing PCM signals. The casing is thus empty. In this condition, reproduction is initiated. When the reproduction is completed, the empty casing is inserted from the open side into the apparatus. The video disc held by the holding frame is stored in the casing from the open side, and the holding frame is locked in the casing. When the casing is withdrawn from the apparatus, the video disc with the holding frame in the casing is removed from the apparatus.

For accomplishing the above-mentioned operation, when the casing in which the video disc is surrounded by the holding frame which is in turn locked by the casing is inserted in the apparatus for reproducing PCM signals, holding means is required for unlocking the holding frame from the casing and for holding the holding frame to the apparatus and, after reproduction is completed and when the empty casing is inserted to the apparatus in which the video disc is mounted, for releasing engagement of the holding frame with the apparatus and for locking the holding frame to the casing. Conventionally, such a holding means has been proposed. However, it has a complex structure and requires many component parts. With this holding means, the holding frame may not be smoothly locked and erratic operation often occurs. Further, a great force is required for inserting the casing into the apparatus, so those who are not strong enough to insert the case cannot conveniently use the holding means.

SUMMARY OF THE INVENTION

The present invention has been accomplished in consideration of these circumstances and has for its object to provide an apparatus for reproducing signals from a disc, which does not require a great force for smoothly inserting a casing therein, which holds a holding frame without failure, and which includes a holding means having a small number of component parts with simple construction.

According to an aspect of the present invention, there is provided a video disc reproduction apparatus in which a disc surrounded by a holding frame and stored in a casing is inserted the holding frame having locking means for being locked with said casing when the holding frame is inserted in the casing, and which comprises a housing; and holding means for holding the holding frame when the casing which stores the disc with the holding frame is inserted in the housing and whereby, after the casing is withdrawn from the housing, the disc remains in the housing, and for releasing the holding frame when the empty casing is inserted in the housing and whereby, after the casing is withdrawn therefrom, the disc is removed from the housing, characterized in that the holding means includes:

a member for releasing locking engagement between the casing and said holding frame by the locking means when the casing which stores the disc with the holding frame is inserted in the housing, and for causing locking engagement between the casing and the holding frame by the locking means when the empty casing is inserted in the housing;

a gear assembly including a ratchet gear which has gear teeth numbering "2n" on the outer circumference thereof and which is rotatable in one direction, and a cam gear which has gear teeth numbering "n" on the outer circumference thereof and which is ganged to rotate with the ratchet gear, the bottom land of the cam gear being defined as a first cam surface and the tooth crest thereof being defined as a second cam surface;

a moving mechanism which is reciprocally movable while being engaged with the casing inserted in the housing and which pivots the ratchet gear by an angle corresponding to one tooth along the one direction; and a locking member having a fulcrum, a point of action and a point of reaction, the fulcrum providing pivotal support at the housing, the point of action being in contact with the first or second cam surface of the cam gear, the point of reaction being engaged with the holding frame to lock the holding frame to the housing when the point of action is in contact with the first cam surface, and the point of reaction not being engaged with the holding frame when the point of action is in contact with the second cam surface.

DETAILED DESCRIPTION OF THE PREFERRED EMBODIMENT

One embodiment of an apparatus for reproducing signals from a disc according to the present invention will be described in detail with reference to the accompanying drawings.

Figure 1:
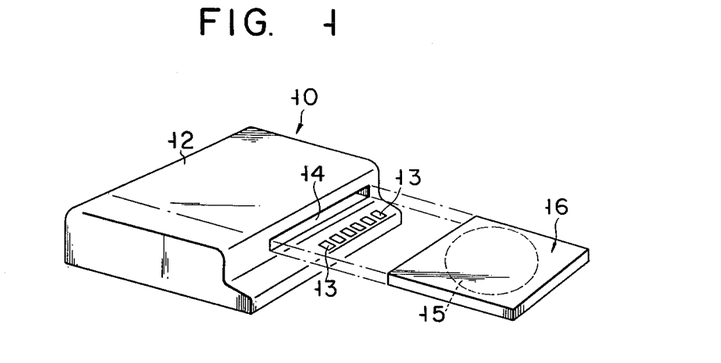
FIG. 1 is a perspective view illustrating one embodiment of an apparatus for reproducing signals from a disc according to the present invention.

Referring to FIG. 1, an apparatus 10 for reproducing signals from a disc is a video disc player in this embodiment. The video disc player 10 has a housing 12. A plurality of operation buttons 13 are arranged on the front upper surface of the housing 12 to instruct various operations. A horizontally extending insertion inlet 14 is formed for insertion of a casing 16 at the front side surface of the housing 12. A reproducing mechanism (not shown) for reproducing PCM signals on a video disc 15 is mounted in the housing 12.

When the player 10 is in nonreproducing condition, the video disc 15 is stored with a holding frame 17 in the casing 6. In this condition, the video disc 15 is not exposed, so that the video disc 15 does not come in direct contact with the fingers. The video disc 15 is thus not contaminated.

Figure 2:
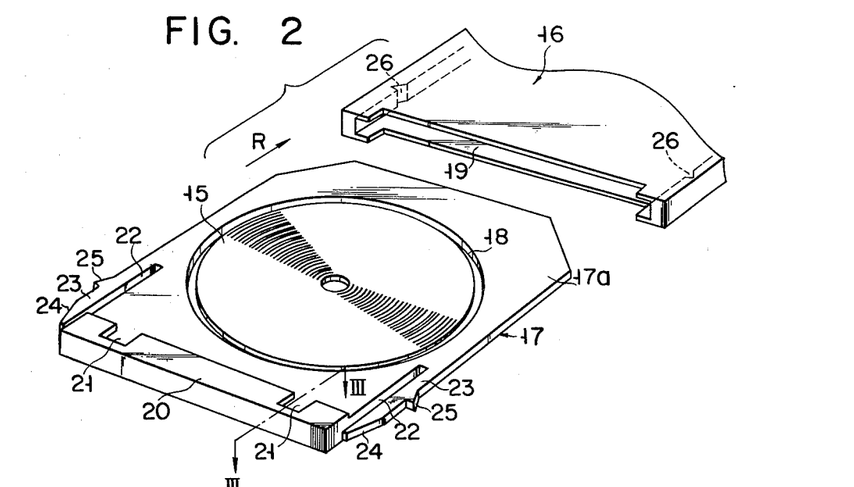
FIG. 2 is a perspective view illustrating a video disc, a holding frame which holds the video disc, and a casing for storing the video disc, all of which are employed for the apparatus for reproducing signals as shown in FIG. 1.

As shown in FIG. 2, the video disc 15 is arranged in a through hole 18 which is slightly larger than the video disc 15 and which is formed at the center of the holding frame 17. Therefore, the video disc 15 moves integrally with the holding frame 17 in accordance with the horizontal movement of the holding frame 17, while the video disc 15 is free to move vertically, independently of the holding frame 17. The casing 16 is formed as a thin box, one side of which has an opening 19 through which the video disc 15 with the holding frame 17 is inserted in the direction shown by an arrow R. A space is formed inside the casing 16 to store the video disc 15 with the holding frame 17.

Figure 3:
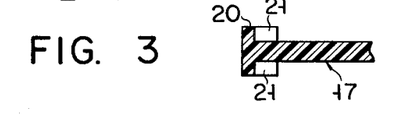
FIG. 3 is a sectional view taken along the line III—III of FIG. 2.

The holding frame 17 has a main body 17a which is slightly thicker than the video disc 15 and is slightly thinner than the height of the opening 19 of the casing 16 and which has the through hole 18, and a bank 20 of substantially the same thickness as the casing 16, which is formed at one side along the direction perpendicular to the arrow R. Recesses 21 are formed on upper surface at both ends of the bank 20. The bottom surfaces of the recesses 21 are even with the upper surface of the main body 17a. As shown in FIG. 3, the recesses 21 are also formed on the lower surfaces at both ends of the bank 20. Slits 22 are formed with a predetermined length in the direction of insertion shown by the arrow R at both sides of the main body 17a of the holding frame 17. A pair of elastic segments 23 extending along the direction of insertion shown by the arrow R are defined by the slits 22 at both sides of the main body 17a. A pawl 25 is formed in the middle of each elastic segment 23, protruding outwardly. Each pawl 25 has a locking surface perpendicular to the direction of insertion shown by the arrow R, and a pressing surface which is inclined, tapering along the direction of insertion. The outer surface of the top of each elastic segment 23 is an inclined surface 24 which tapers along the opposite direction to the direction of insertion shown by the arrow R.

Locking grooves 26 are formed on the inner surfaces which define the inner space of the casing 16 at the corresponding positions for receiving the respective pawls 25 of the holding frame 17 when the holding frame 17 is completely inserted in the casing 16. As the holding frame 17 surrounds the video disc 15, the side of the holding frame 17 at which the bank 20 is not formed is oriented toward the opening 19, and the holding frame 17 is inserted in the casing 16 through the opening 19. While the pawls 25 become in contact with the edges of the opening 19 of the casing 16 during insertion, both elastic segments 23 are urged inwardly due to engagement with the pressing surfaces of the pawls 25. When the holding frame 17 having the video disc 15 is inserted completely into the casing 16, the pawls 25 are then fitted in the grooves 26 by the elastic force of the elastic segment 23, thus locking the holding frame 17 to the casing 16. In this condition, the bank 20 seals the opening 19 of the casing 16 completely, preventing dust from entering the casing 16, and contaminating the video disc 15. Even if the bank 20 is grasped to pull out the video disc 15, the holding frame cannot be removed since the holding frame 17 is engageably locked with the casing 16.

Figure 4:
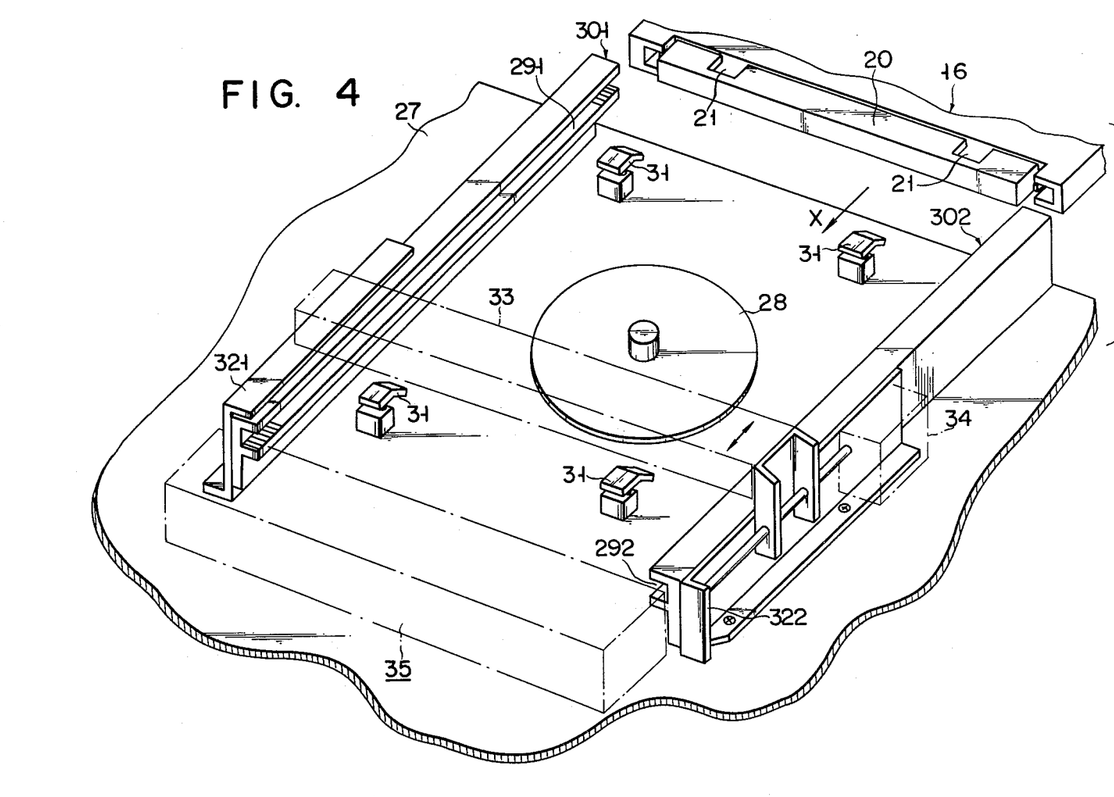
FIG. 4 is a perspective view schematically illustrating an inner arrangement of the apparatus of FIG. 1.

Referring to FIG. 4, a guide mechanism of the casing 16 inside the player 10 will be described.

As shown in the figure, a chassis 27 extending horizontally is formed in the housing 12 of the player 10. A turntable 28 which has a diameter smaller than the video disc 15 is mounted on the chassis 27 to be pivotally and vertically movable driven by a drive mechanism (not shown). A pair of a guide rails 301 and 302 are mounted parallel to each other on the chassis 27 with the turntable 28 interposed therebetween. The guide rails 301 and 302 extend in the direction shown by an arrow X (as opposed to the direction of insertion shown by the arrow R). One end of each of guide rails 301 and 302 is mounted at an end of the insertion inlet 14 shown in FIG. 1. The guide rails 301 and 302 have grooves 291 and 292 which receive both sides of the casing 16 and which are formed at a predetermined height from the upper surface of the chassis 27. The guide rails 301 and 302 have sufficient length to allow complete insertion of the holding frame 17 in the housing 12.

The guide rails 301 and 302 are mounted on the chassis 27 through a pair of auxiliary chassis 321 and 322. A pickup arm 33 extends perpendicularly to the direction shown by the arrow X over the auxiliary chassis 321 and 322. The pickup arm 33 is movable along the direction shown by the arrow X. At one chassis 322, a drive mechanism 34 (details not shown) is mounted to drive the pickup arm 33. A reproducing stylus (not shown) is mounted to the pickup arm 33. The reproducing stylus engages with the groove of the video disc 15 placed on the turntable 28 and picks up audio/video signals recorded on the video disc 15.

Four supporting members 31 are mounted outside the perimeter of the turntable 28 on the chassis 27. These supporting members 31 provide support at the periphery of the through hole 18 formed in the main body 17a of the holding frame 17 and the peripheral edge of the video disc 15 while the video disc 15 is completely stored in the housing 12. The upper surface of the turntable 28 is lower than the level of the supporting members 31 in the inoperative condition. The upper surfaces of the supporting members 31 are substantially the same height as the lower surfaces of the grooves 291 and 292 of the guide rails 301 and 302.

A holding device 35 (to be described later) is attached to that portion of the chassis 27 which faces to the other ends of respective guide rails 301 and 302, in order to hold the bank 20 as needed. The holding device 35 operates to unlock the holding frame 17 from the casing 16 and to hold the holding frame 17 when the casing 16 in which the video disc 15 is held by the holding frame 17 is inserted in the housing 12. The holding device 35 also operates to release the holding frame 17 and to lock the holding frame 17 to the casing 16 when reproduction is completed and the empty casing 16 is inserted in the housing 12 in which the video disc 15 is mounted.

The mounting operation of the video disc 15 will be described with reference to FIGS. 5A to 5C.

The video disc 15 with the holding frame 17 is stored in the casing 16. While the holding frame 17 is locked with the casing 16, the casing 16 is inserted in the housing 12 from one end through the insertion inlet 14. Both sides of the casing 16 are guided by the grooves 291 and 292 of the guide rails 301 and 302, and the casing 16 is guided inside the housing 12. As shown in FIG. 5A, the lower surface of the casing 16 is supported by the upper surfaces of the four supporting members 31. Since the turntable 28 is lower than the holding members 31, the mounting operation is not inhibited by the turntable 28.

Figure 5A:
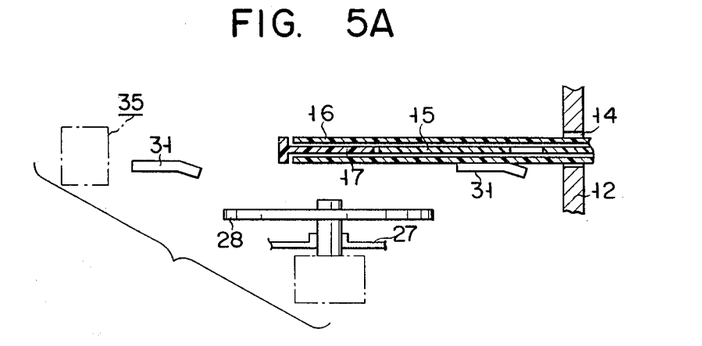
FIGS. 5A to 5C are side views schematically illustrating operations of the apparatus shown in FIG. 1.

When the casing 16 is further inserted from the condition shown in FIG. 5A, one end of the casing 16 comes in contact with the holding device 35. The bank 20 of the holding frame 17 is held by the holding device 35, and the locking engagement between the casing 16 and the holding frame 17 is released. When the casing 16 is pulled out in this condition, the empty casing 16 is removed, leaving the video disc 15 with the holding frame 17 inside the housing 12 since the holding frame 17 is held by the holding device 35. The holding frame 17 and the video disc 15 are thus supported by the four supporting members 31 as shown in FIG. 5B.

Figure 5B:
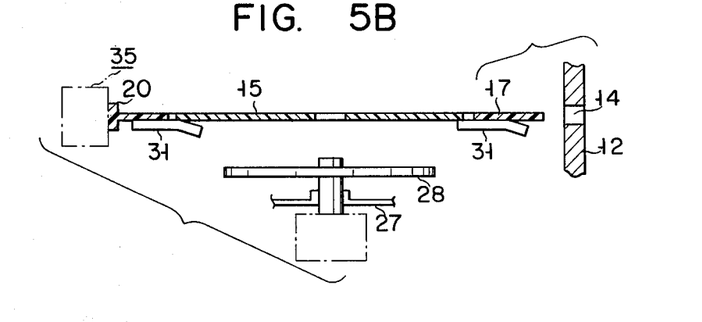
Figure 5C:
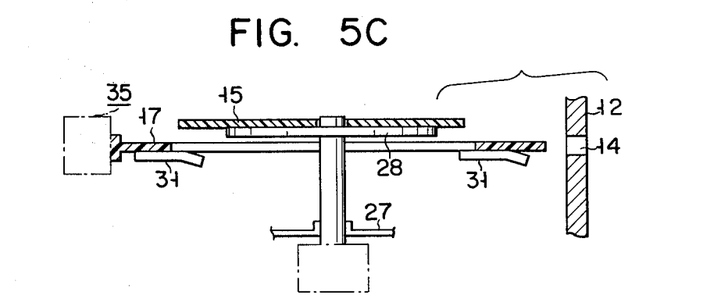

In this condition as shown in FIG. 5B, when an operating button 13 is depressed to start reproduction, the turntable 28 moves upward to receive the video disc 15 thereon and further lifts the video disc 15. Therefore, the video disc 15 is set at a position higher than the level of the holding members 31, so that the video disc 15 is released from the support of the supporting members 31 as shown in FIG. 5c. In this condition shown in FIG. 5c, the turntable 28 starts rotating, while the pickup arm 33 is moved to a predetermined position and the reproducing stylus thereof picks up the audio/video signals from the video disc 15.

When reproduction is completed, the pickup arm 33 returns to the initial position and the turntable 28 stops rotating. The turntable 28 descends to the level shown in FIG. 5B, and the video disc 15 is supported by the supporting members 31. In this condition, the empty casing 16 is inserted, from one end, in the housing 12 through the opening 19. When the end of the casing 16 at which the opening 19 is formed is in contact with the bank 20 of the holding frame 17, the holding frame 17 is locked with the casing 16 and the holding device 35 releases the holding frame 17 from the housing 12. Therefore, when the casing 16 is withdrawn from the housing 12, the video disc 15 with the holding frame 17 in the casing 16 is removed from the housing 12 as shown in FIG. 5A.

Since a driving force is transmitted to the turntable 28 through a belt (not shown), the driving force is properly transmitted even if the turntable 28 vertically vibrates.

The holding device 35 will be described in detail with reference to FIGS. 6 to 11B.

Figure 6:
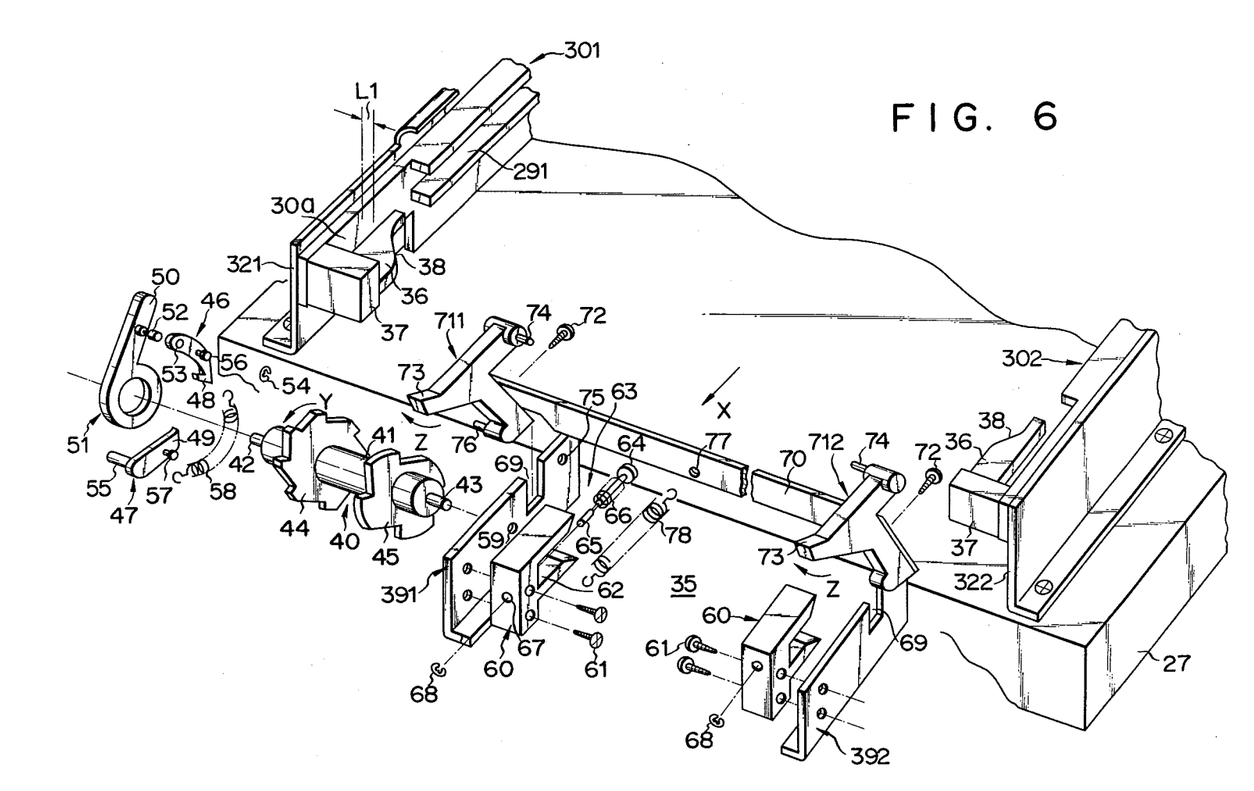
FIG. 6 is an exploded perspective view illustrating a holding device shown in FIG. 4.

Referring to FIG. 6, a pair of rigid tongues 36 are mounted to an auxiliary chassis 321 and 322 through members 37, the rigid tongues 36 being opposite to the other ends of the pair of guide rails 301 and 302. Each tongue 36 extends along the direction of insertion shown by the arrow X and is spaced apart from an inner surface 30a of each guide rail 301 or 302 at a predetermined distance L1. The inner surfaces of the tongues 36 are constituted by inclined surfaces 38 which are inwardly inclined along the direction of insertion shown by the arrow X. The inclined surface 38 of each tongue 36 engages with the inclined surface 24 of the corresponding elastic segment 23 when the casing 16 is completely mounted in the housing 12. The elastic segments are thus urged inward. By the shift of the elastic segment 23, the pawls 25 become disengaged from the locking grooves 26 of the casing 16.

Figure 7:
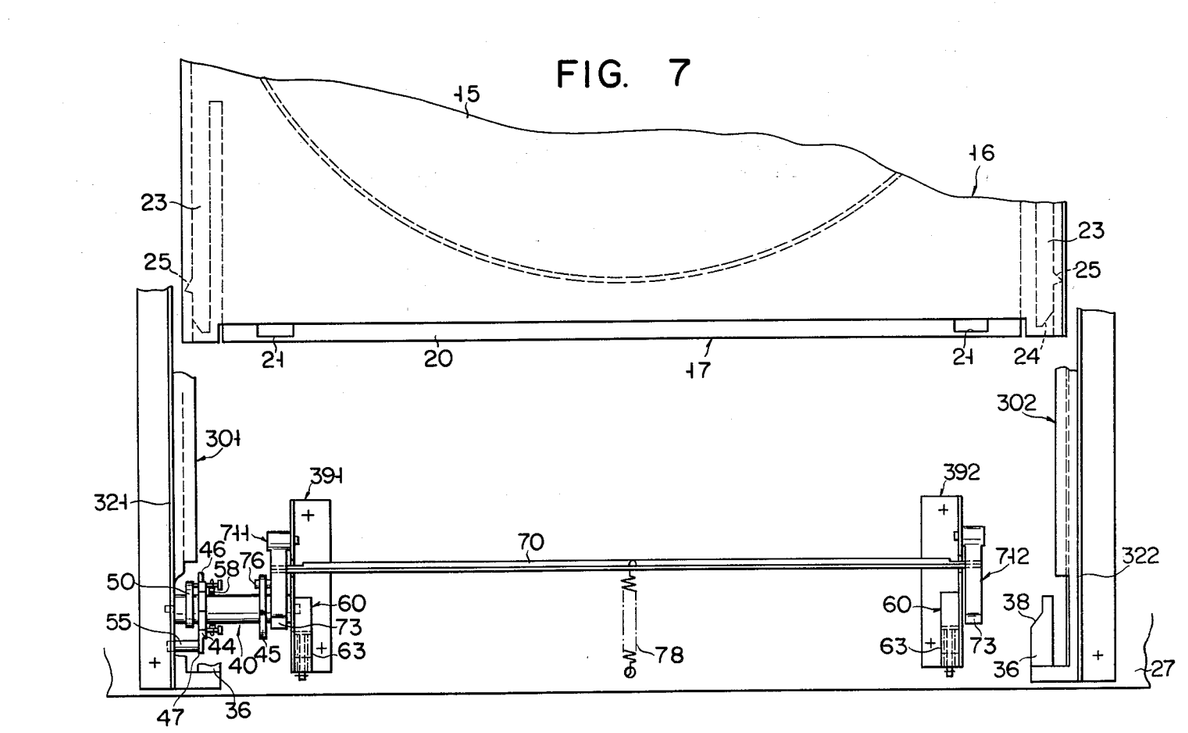
FIG. 7 is a plan view of the holding device shown in FIG. 4.
Figure 8:
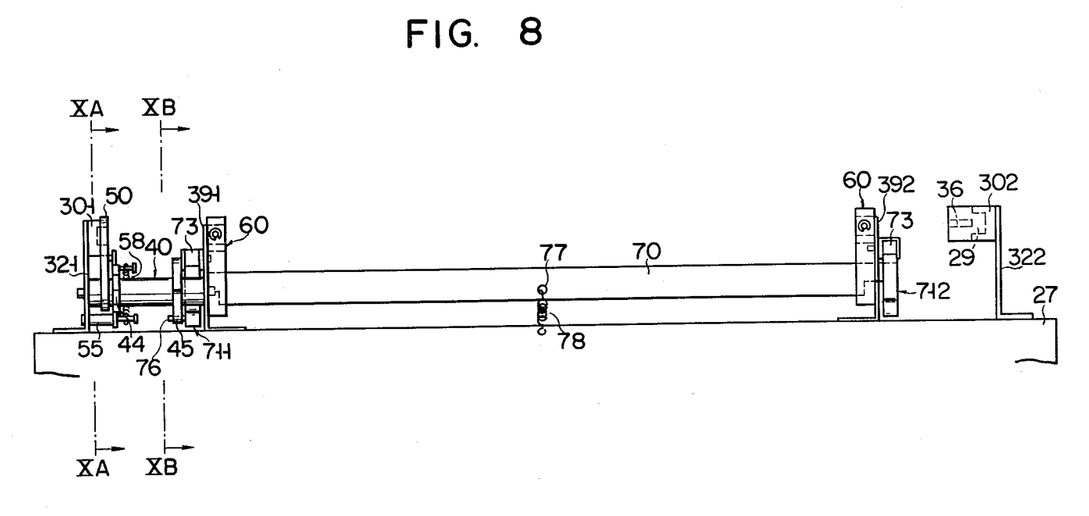
FIG. 8 is a front view of the holding device shown in FIG. 4.

The first and second mounting plates 391 and 392 are mounted at the other end of the chassis 27 and provided parallel to each other along the direction of insertion shown by the arrow X at a predetermined distance, between the pair of guide rails 301 and 302 (refer to FIGS. 7 and 8). A gear assembly 40 which has a rotation axis in the horizontal direction perpendicular to the direction of insertion shown by the arrow X is pivotable about the axis between the first mounting plate 391 and the auxiliary chassis 321. The gear assembly 40 integrally comprises a cylindrical portion 41, shafts 42 and 43 coaxially extending outward from both ends of the cylindrical portion 41, a ratchet gear 44 and a cam gear 45 coaxially mounted on the outer surface of the cylindrical portion 41 with a predetermined distance therebetween. The ratchet gear 44 has 8 saw-teeth and the cam gear 45 has half as many saw-teeth as the ratchet gear 44, that is, 4 teeth, both saw-teeth allowing rotation in one direction shown by an arrow Y. The bottom land of the cam gear 45 is defined as a first cam surface and the tooth crest thereof is defined as a second cam surface.

A latch 46 is provided to the ratchet gear 44 to engage with one saw-tooth for rotating the ratchet gear 44 in the direction shown by the arrow Y, while a stopper 47 is provided to the ratchet gear 44 to engage with another saw-tooth for prohibiting rotation of the ratchet gear 44 in the other direction. A rotary member 51 is rotatably mounted on the part of the outer surface of the cylindrical portion 41 which is adjacent to the outside of the ratchet gear 44. The rotating member 51 has a lever 50 extending outward. A pin 52 at the distal end of the lever 50 extends toward the ratchet gear 44. A hole 53 is formed at the proximal end of the latch 46 for insertion of the pin 52 therein. The latch 46 is pivotally mounted on the rotary member 51 by snap-fitting of the pin 52 and the hole 53 through a snap ring 54. A hook 48 is formed at the distal end of the latch 46 to engage with one saw-tooth of the ratchet gear 44.

The stopper 47 described above is rotatably mounted on the auxiliary chassis 321 through a pin 57 formed at the proximal end thereof. The distal end of the stopper 47 is tapered so as to engage with the other saw-tooth of the ratchet gear 44 easily. Pins 57 and 56 are fitted extending toward the ratchet gear 44, to the center of the stopper 47 and the latch 46, respectively. A coil spring 58 is stretched between the pins 56 and 57 to bias the latch 46 and the stopper 47 in the direction for engagement with the ratchet gear 44.

One shaft 42 of the gear assembly 40 described above is rotatably fitted in a hole (not shown) of the auxiliary chassis 321, while the other shaft 43 of the gear assembly 40 is rotatably fitted in a through hole 59 formed in the first mounting plate 391. The lever 50 of the rotary member 51 is received in a gap (having a distance L1) between the inner surface 30a of one guide rail 301 and the outer surface of the tongue 36. The rotary member 51 is constantly urged by the urging force of the coil spring 58 in the direction opposite to the direction shown by the arrow Y.

Clamping members 60 are respectively attached to the opposite surfaces to the first and second mounting plates 391 and 392 by screws 61. Each clamping member 60 has an F-shaped cross section and a recess 62 at the side opposing the guide rails 301 and 302. The bank 20 of the holding frame 17 is loosely received in the recess 62 of the pair of clamping members 60 when the holding frame 17 is completely mounted in the housing 12. A damper 63 is respectively mounted in each recess 62. Each damper 63 comprises a pin 65 provided with a flange 64 at the distal end thereof, and a coil spring 66 which is wound on the outer surface of the pin 65 and which urges the pin 65 outward. The proximal end of the pin 65 extends through the clamping member 60 in the direction shown by the arrow X through a through hole 67 having a diameter slightly larger than that of the pin 65, and the proximal end of the pin 65 reaches the other side of the clamping member and is fitted with a snap ring 68 in order to prevent removal. The bank 20 inserted in the recess 62 thus has a buffer effect by these dampers 63 so that gentle insertion is accomplished and the bank 20 is quickly removed from the recess 62 by an urging force of the coil spring 66 when the holding frame 17 is released from the housing 12.

Notches 69 are formed on the upper side of the first and second mounting plates 391 and 392. First and second engaging members 711 and 712 are mounted at the outer sides of the first and second mounting plates 391 and 392 to be pivotal in the plane perpendicular to the direction of insertion shown by the arrow X. The engaging members 711 and 712 have a T-shaped cross section and, shafts 74 extending toward the opposing mounting plates 391 and 392, respectively, at the front end of the front side along the direction of insertion shown by the arrow X. Holes 75 are formed to receive the respective shafts 74 at the respective mounting plates 391 and 392 opposed thereto. By rotatably mounting the respective shafts 74 in the holes 75, the respective engaging members 711 and 712 are rotatably pivoted to the respective mounting plates 391 and 392. A common tie rod 70 is attached to arms of the engaging members 711 and 712. The arms extend below the locking members 711 and 712 and are fixed through a screw 72 in order to connect the engaging members 711 and 712 each other. The tie rod 70 is made of a rigid plate, so that the engaging members 711 and 712 are integrally pivotal. When assembled, the tie rod 70 is inserted in the notches 69 of the mounting plates 391 and 392. Therefore, the pivotal movement of the tie rod 70 may not be prevented.

A pin 76 is attached to the lower end of the arm of the first engaging member 711, extending toward the cam gear 45. A hole 77 is formed substantially at the center of the cutaway tie rod 70 in the figure. One end of a coil spring 78 is engaged in the hole 77 and the other end thereof is engaged with the chassis 27. The coil spring 78 urges the engaging member 711 and 712 to rotate then about the shafts 74 in the direction shown an arrow Z. Therefore, the pins 76 are constantly in contact with the cam surfaces formed on the outer pheriphery of the cam gear 45.

The tooth crest of each gear tooth of the cam gear 45 constituting the second cam surface is defined by a plane connecting the tips of adjacent teeth of the ratchet gear 44 having 8 saw-teeth. In the condition in which the pin 76 is in contact with the first cam surface corresponding to the bottom land of the cam gear 45, when the ratchet gear 44 is pivoted by one teeth along the direction shown by the arrow Y, the pin 75 becomes in contact with the second cam surface corresponding to the tooth crest. The rear end of each of the engaging members 711 and 712 is tapered, so that the rear segment is defined as a engaging segment 73. Each engaging segment 73 is inserted in the respective recess 21 formed on the bank 20 of the holding frame 17, respectively, when the pin 76 is in contact with the first cam surface. When the pin 76 is in contact with the second cam surface, the engaging segment 73 is not engaged in the recess 21 of the holding frame 17.

The lever 50 described above is engageable with one end of the casing 16 which is guided on the guide rails 301 and 302 in the housing 12. When the bank 20 of the holding frame 17 inserted in the casing 16 is held in the recess 62 of the clamping member 60, but before the casing 16 is completely inserted in the housing 12, the lever 50 is rotated by a predetermined angle in the direction shown by the arrow Y. This predetermined angle corresponds to the rotation of one tooth of the ratchet gear 44 which is rotated through the latch 46 in accordance with the pivotal movement of the lever 50.

The mode of operation of the holding device 35 with the structure described above will now be described.

The casing 16, in which locked is the holding frame 17 holding the video disc 15, is inserted in the housing 12 of the player 10 through the insertion inlet 14 for reproducing PCM signals. The casing 16 is guided by the pair of guide rails 301 and 302 and is led inside the housing 12. The bank 20 of the holding frame 17 is inserted in the recess 62 of the clamping member 60 and is stopped gently by the dampers 63. At this time, the inclined surfaces 38 of the tongues 36 press the inclined surfaces 24 of the elastic segments 23 of the holding frame 17 inward, so that the pawls 25 are released from the locking grooves 26 of the casing 16 and the holding frame 17 is unlocked from the casing 16.

Figure 10A:
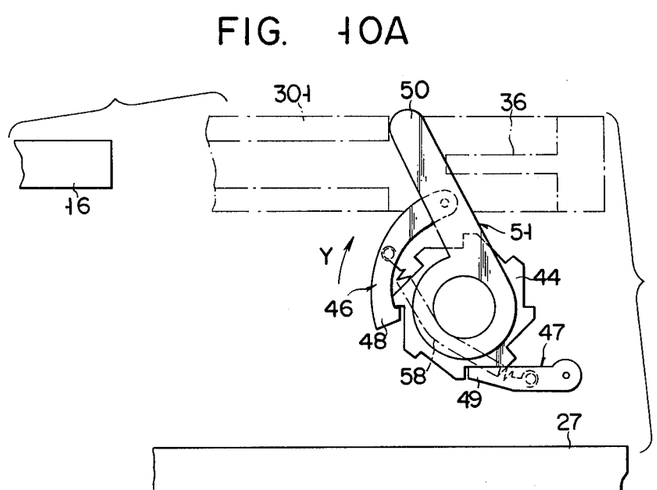
FIGS. 10A and 10B are side views illustrating inoperative condition of first and second gears of the holding device taken along the line XA—XA and XB—XB of FIG. 8, respectively.
Figure 10B:
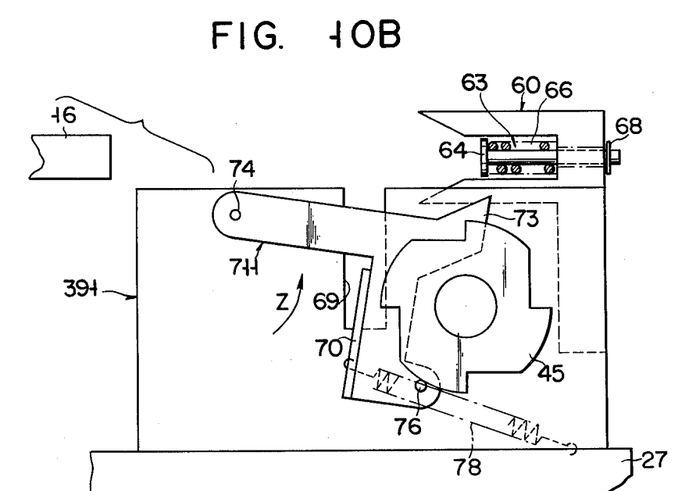

As shown in FIG. 10A, the lever 50 of the rotary member 51 is urged in the direction opposite to the direction shown by the arrow Y by the urging force of the coil spring 58 when the casing 16 is not in contact with the lever 50. The distal end of the lever 50 comes in contact with the terminal end of the guide rail 301 and maintains this position. In this condition, the hook 48 of the latch 46 is engaged with one tooth of the ratchet gear 44. However, when the lever 50 and the ratchet gear 44 are in the positions as shown in FIG. 10A, the pin 76 of the first engaging member 711 is in contact with the second cam surface (tooth crest) of the cam gear 45 as shown in FIG. 10B. Therefore, in this condition, the engaging segment 73 of the first engaging member 711 is not engaged in the recess 21 of the bank 20.

Figure 11A:
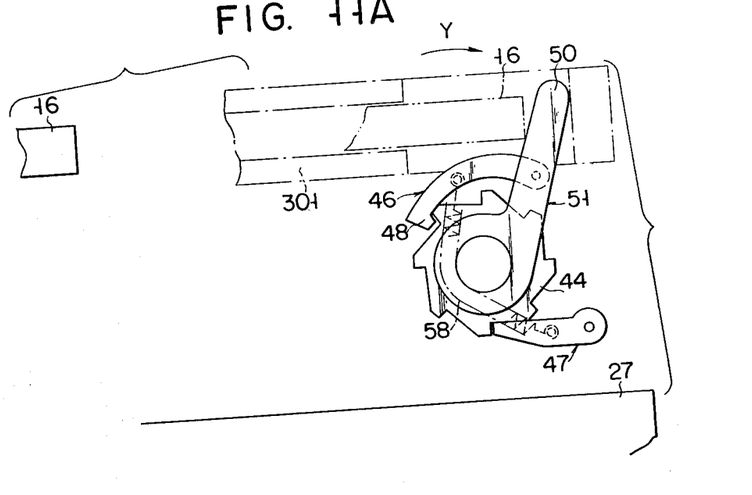
FIGS. 11A and 11B are side views illustrating the operative condition of the first and second gears of the holding device, respectively.
Figure 11B:
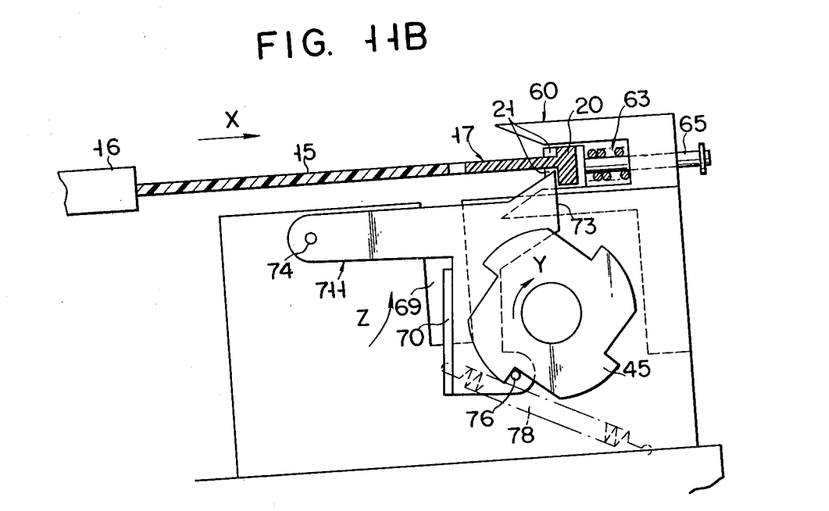

In the inoperative condition of the holding device 35 described above, when the bank 20 of the holding frame 17 is inserted in the recess 62 of the clamping member 60 and the holding frame 17 is gently stopped by the dampers 63, the lever 50 is pushed by the front end of the casing 16 and is pivoted by the predetermined angle in the direction shown by the arrow Y against the urging force of the coil spring 58. Therefore, the ratchet gear 44 is pivoted by the predetermined angle corresponding to the rotation of one tooth in the direction shown by the arrow Y through the latch 46, thus achieving the condition shown in FIG. 11A. On the other hand, the cam gear 45 corresponding to the one-tooth rotation of the ratchet gear 44 pivots by the same angle in the direction shown by the arrow Y. Therefore, the pin 76 changes from the position in which it is in contact with the second cam surface of the cam gear 45 to the position in which it is in contact with the first cam surface (bottom land) as shown in FIG. 11B. According to the movement of the pin 76, the first engaging member 711 rotates in the direction shown by the arrow Z by the urging force of the coil spring 78, and the engaging segment 73 of the first engaging member 711 is inserted in the recess 21 formed in the bank 20 of the holding frame 17. Therefore, the movement of the holding frame 17 along the direction opposite to the direction of insertion shown by the arrow X is prohibited by the engaging segment 73 of the first engaging member 711, thereby achieving the holding engagement of the holding frame 17. Since the second engaging member 712 is interconnected to the first engaging member 711 through the tie rod 70, the second engaging member 712 operates in the same manner as the first engaging member 711.

Figure 9:
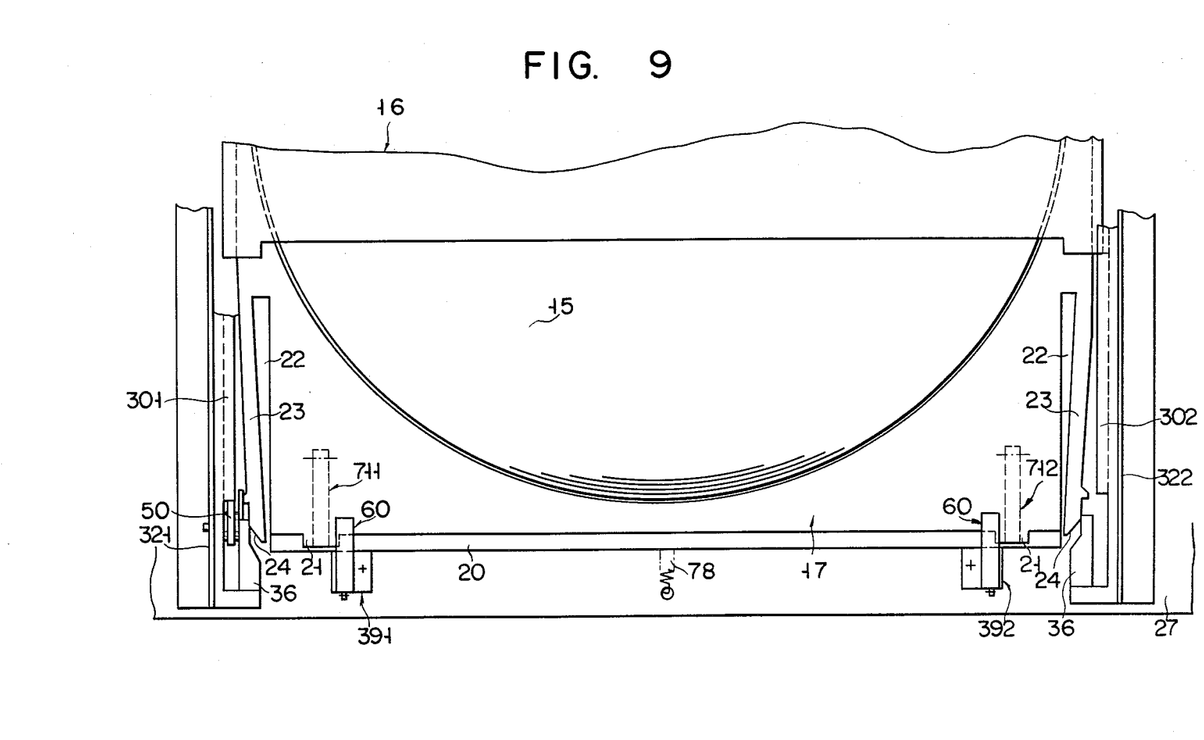
FIG. 9 is a plan view illustrating the condition in which the holding device clamps a holding frame.

In this condition, the casing 16 is pulled out, the holding frame 17 is released from the casing 16, and the holding frame 17 is held by the holding device 35 instead, so that the holding frame 17 and the video disc 15 remain inside the housing 12 as shown in FIG. 9 and only the casing 16 is removed from the housing 12. When the casing 16 is removed, the lever 50 returns to the inoperative position shown in FIG. 10A by the urging force of the coil spring 58. However, since the stopper 47 is constantly engaged with the ratchet gear 44, thereby preventing rotation in the direction opposite to the direction shown by the arrow Y, the lever 50 is maintained in the position shown in FIG. 11A. Therefore, the hook 48 of the latch 46 is moved to be engaged with the adjacent tooth in the direction opposite to the direction shown by the arrow Y. Since the cam gear 45 and ratchet gear 44 are integrally formed, the lever 50 is maintained in the operative position as shown in FIG. 11B, even though the lever 50 returns to the inoperative position. In other words, when the lever 50 returns to the inoperative position, the holding condition of the holding frame 17 is maintained.

In the condition in which the video disc 15 is mounted in the housing 12, reproduction is initiated and after the predetermined reproduction is completed, the empty casing 16 is inserted in the housing 12 through the insertion inlet 14 again. By this insertion, the lever 50 is again pushed by the front end of the casing 16 and is pivoted to the operative position. Therefore, the ratchet gear 44 is moved from the position shown in FIG. 10A to the position shown in FIG. 11A through the latch 46. According to this pivotal movement, the cam gear 45 moves from the position shown in FIG. 11B to the position shown in FIG. 10B. The pin 76 is moved from the position in which the pin 76 is in contact with the first cam surface of the cam gear 45 to the position in which it is in contact with the second cam surface of the cam gear 45. The engaging members 711 and 712 are thus pivoted in the direction opposite to the direction shown by the arrow Z. Corresponding to this pivotal movement, the engaging segments 73 of the engaging members 711 and 712 are disengaged from the recesses 21 of the bank 20, so that the holding frame 17 is released from the holding device 35.

When the holding frame 17 is released from the holding device 35, the bank 20 is quickly detached from the recesses 62 of the clamping members 60 by the urging force of the coil springs 66 of the dampers 63 and is moved forward the casing 16. Therefore, the pressure on the elastic segments 23 by the tongues 36 is released so that the holding frame 17 accompanying the video disc 15 is completely stored in the casing 16 and the pawls 25 are engaged with the locking grooves 26 to lock the holding frame 17 with the casing 16. In this condition, when the casing 16 is pulled out of the housing 12, the holding frame 17 and the video disc 15 in the casing 16 are also withdrawn.

When the casing 16 is withdrawn, the lever 50 returns to the inoperative position shown in FIG. 10A by the urging force of the coil spring 58. Since the stopper 47 is constantly engaged with the ratchet gear 44 to prohibit rotation in the direction opposite to the direction shown by the arrow Y, the lever 50 is maintained in the position shown in FIG. 11A. Therefore, the hook 48 of the latch 46 engages with an adjacent tooth located in the direction opposite to the direction shown by the arrow Y. Even if the lever 50 returns to the inoperative position, the cam gear 45 and the ratchet gear 44 are integrally formed so that the lever is maintained in the inoperative position shown in FIG. 10B. In other words, in the condition in which the holding device 35 is holding, when the lever 50 reciprocally moves between the operative position and the inoperative position, the holding frame 17 is released from the holding device 35.

The embodiment described above is not limited to this arrangement and number of components. Further modifications and changes may be provided within the scope and spirit of the present invention.

In the gear assembly 40 in the above embodiment, for example, the number of teeth for the ratchet gear 44 was 8 and the number of teeth for the cam gear 45 was 4. The numbers of teeth are not limited to the numbers described above. The ratio of the number of teeth of the ratchet gear 44 to the number of teeth of the cam gear 45 need only be 2:1. Therefore, the number of teeth for the ratchet gear 44 and the cam gear 45 may be 10:5 or 6:3. Further, the disc is not limited to the video disc but may be extended to an audio disc on which signals are recorded with the PCM system.

In summary, according to one embodiment of the present invention, insertion and removal of the video disc 15 with the holding frame 17 are performed while the video disc 15 with the holding frame 17 is in the casing 16 and the holding frame 17 is locked with the casing 16, so that contamination of the video disc 15 with dust or fingerprints is prevented.

Since the holding device 35 comprises the gear assembly and the first and second engaging member 711 and 712 cooperated therewith, and performs the holding operation of the holding frame 17 to the housing 12 and the releasing operation of the holding frame 17 therefrom, smooth operation is achieved and erratic operations are eliminated. Further, the holding operation of the holding frame 17 to the housing 12 is performed when the casing 16 pushes the lever 50 to be pivoted, so that resistance is small when the holding frame 17 is inserted and operability is further improved. The component parts of the holding device 35 are relatively small in number.

The coil spring 58 mounted to the rotary member 51 has functions of forcing contact between the latch 46 and the ratchet gear 44, of forcing contact between the stopper 47 and the ratchet gear 44, and of urging the lever 50 in one direction. Therefore, the smooth rotational movement of the ratchet gear 44 is guaranteed. Since the stopper 47 is in contact with the ratchet gear 44 in every locking operation and releasing operation thereof, and since a contact sound is generated, the operator can confirm the holding operation and releasing operation.

Further, the dampers not only absorb the impact when the casing 16 is inserted, but also push the released holding frame 17 from the holding device 35 toward the empty casing 16, so that the holding frame 17 is completely stored in the casing 16.

What we claim is:

1. An apparatus for reproducing signals from an information carrying disc, in which the disc, surrounded by a holding frame and stored in a casing, is inserted into the apparatus, said holding frame having locking means for being locked with said casing when the holding frame is inserted in the casing, and a bank which is formed at one side thereof along a direction perpendicular to direction of inserting the casing into said apparatus, comprising:
   (A) a housing; and
   (B) holding means for holding said holding frame when said casing is inserted in the housing and whereby, after the casing is withdrawn from the housing, the disc remains in said housing, and for releasing said holding frame when the empty casing is inserted in said housing and whereby, after the casing is withdrawn therefrom, the disc is removed from said housing, said holding means including:
   (a) a member for releasing locking engagement between said casing and said holding frame by said locking means when said casing is inserted in said housing, and for causing locking engagement between said casing and said holding frame by said locking means when the empty casing is inserted in said housing;
   (b) a gear assembly including a ratchet gear which has gear teeth numbering "2n" on the outer circumferences thereof and which is rotatable in one direction around a predetermined axis parallel to the casing, and a cam gear which has gear teeth numbering "n" on the outer circumference thereof, the outer surface of said gear teeth being defined as first cam surfaces, said cam gear being ganged to rotate with said ratchet gear, a bottom land of said cam gear being defined as a second cam surface;
   (c) a moving mechanism which is swingable while being engaged with said casing inserted in said housing and which pivots said ratchet gear by an angle corresponding to one tooth along said one direction, said moving mechanism including:
      (c1) a lever which is pivotally mounted to said ratchet gear to be rotatable around said predetermined axis and which is engageable with said casing which is inserted in the housing to swing within a predetermined range in correspondence with one insertion and withdrawal of said casing,
      (c2) a latch, one end of which is pivotally supported by said lever and the other end of which is engaged with one tooth of said ratchet gear, so that one tooth of said ratchet gear may be pivoted in correspondence with the reciprocal pivotal movement of said lever, and
      (c3) a stopper, one end of which is pivotally supported by said housing and the other end of which is engaged with the other tooth of said ratchet gear, so that rotation of said ratchet gear in the opposite direction may be prevented; and
   (d) a locking member having a fulcrum, a point of action and a point of reaction, said fulcrum providing pivotal support at said housing, said point of action being in contact with the first or second cam surface of said cam gear, said point of reaction being engaged with the bank of said holding frame to hold said holding frame to said housing when said point of action is in contact with the first cam surface, and said point of reaction not being engaged with said holding frame when said point of action is in contact with the second cam surface.

2. The apparatus according to claim 1, wherein said moving mechanism further includes urging means, said urging means pressing said stopper and latch, the other ends of which are pressed against the corresponding teeth of said ratchet gear.

3. The apparatus according to claim 2, wherein said urging means comprises a common coil spring, one end of which is engaged with said latch and the other end of which is engaged with said stopper.

4. The apparatus according to claim 1, 2 or 3 wherein said holding means further includes clamping means for clamping a front end of said casing when the disc with said holding frame in said casing is inserted in said housing and placed in a predetermined position.

5. The apparatus according to claim 4, wherein said clamping means comprises at least one clamping member having a recess for receiving the front end of said casing and an urging member for urging said casing received in the recess in the direction toward the outside of said housing.

6. The apparatus according to claim 5, wherein said urging member comprises a coil spring disposed in the recess.

* * * * *